(12) United States Patent
Chapman et al.

(10) Patent No.: US 10,740,530 B1
(45) Date of Patent: Aug. 11, 2020

(54) CLOCK TREE WIRELENGTH REDUCTION BASED ON A TARGET OFFSET IN CONNECTED ROUTES

(71) Applicant: Cadence Design Systems, Inc., San Jose, CA (US)

(72) Inventors: Andrew Mark Chapman, Milton (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 4 days.

(21) Appl. No.: 16/228,439

(22) Filed: Dec. 20, 2018

(51) Int. Cl.
| | |
|---|---|
| *G06F 17/50* | (2006.01) |
| *G06F 30/392* | (2020.01) |
| *G06F 30/3312* | (2020.01) |
| *G06F 30/396* | (2020.01) |
| *G06F 119/06* | (2020.01) |
| *G06F 119/12* | (2020.01) |

(52) U.S. Cl.
CPC ........ *G06F 30/392* (2020.01); *G06F 30/3312* (2020.01); *G06F 30/396* (2020.01); *G06F 2119/06* (2020.01); *G06F 2119/12* (2020.01)

(58) Field of Classification Search
None
See application file for complete search history.

(56) References Cited

U.S. PATENT DOCUMENTS

| | | | | |
|---|---|---|---|---|
| 5,866,924 A * | 2/1999 | Zhu | ....................... | G06F 30/394 257/208 |
| 6,301,686 B1 * | 10/2001 | Kikuchi | ................ | G06F 30/398 716/122 |
| 6,425,110 B1 * | 7/2002 | Hathaway | ............. | G06F 30/327 716/108 |
| 8,146,039 B2 * | 3/2012 | Shah | ........................ | G06F 30/39 716/114 |
| 8,704,577 B2 * | 4/2014 | Taskin | ....................... | G06F 1/10 327/293 |
| 9,898,035 B2 * | 2/2018 | Yoshiki | ...................... | G06F 1/10 |
| 10,409,944 B2 * | 9/2019 | Siddiqi | .................. | G06F 30/398 |

(Continued)

OTHER PUBLICATIONS

M.D. Moffitt, "MAIZEROUTER: Engineering an Effective Global Router," IEEE Trans. on Computer-Aided Design of Integrated Circuits and Systems, vol. 27, No. 11, Nov. 2008, pp. 2017-2026. (Year: 2008).*

*Primary Examiner* — Leigh M Garbowski
(74) *Attorney, Agent, or Firm* — Schwegman Lundberg & Woessner, P.A.

(57) ABSTRACT

Aspects of the present disclosure address systems and methods for shortening clock tree wirelength based on target offsets in connected routes. A method may include accessing a clock tree comprising routes that interconnect a plurality of pins. Each pin corresponds to a terminal of a clock tree instance. The method further includes identifying a first and second terminal of a clock tree instance in the clock tree. The method further includes determining a first offset based on a distance between the first terminal and a branch in a first route connected to the first terminal and determining a second offset based on a distance between the second terminal and a branch in a second route connected to the second terminal. The method further includes moving the clock tree instance from a first location to a second location based on a target offset determined by comparing the first and second offsets.

20 Claims, 10 Drawing Sheets

(56) References Cited

U.S. PATENT DOCUMENTS

2012/0240090 A1\* 9/2012 Shirai .................. G06F 30/394
716/113
2019/0173781 A1\* 6/2019 Folberth ................ H04L 45/48

\* cited by examiner

US 10,740,530 B1

CLOCK TREE WIRELENGTH REDUCTION BASED ON A TARGET OFFSET IN CONNECTED ROUTES

TECHNICAL FIELD

The present disclosure generally relates to the technical field of integrated circuit design. In particular, the present disclosure addresses systems and methods for reducing clock tree wirelength.

BACKGROUND

An integrated circuit (IC) layout specifies portions of various components of an IC. When the IC is to include a large number of registers, latches, flip-flops, and/or other types of clocked devices ("sinks") that are to be clocked by one or more clocks, the IC must include one or more clock trees for delivering the clock signal from the clock source to all of the sinks to be clocked by it. A clock tree distributes a clock signal from its root to a set of sinks within an IC through a branching network of drivers (e.g., buffers or inverters). A single driver distributes the clock signal to a grouping of other drivers and/or sinks Connectivity between a driver and its fanout is represented by a "clock net" and will be physically implemented by routed wires.

Electronic design automation (EDA) software systems commonly perform clock-tree synthesis (CTS). Conventional approaches to CTS typically include a global wirelength reduction stage and a detailed wirelength reduction stage. During the global wirelength reduction stage, components of the clock tree (referred to hereinafter as "clock tree instances") are interconnected using a Steiner-tree approach in which the components are aligned to a Steiner route between their parents and children. During the detailed wirelength reduction stage, a compass-search algorithm is used to iteratively move clock tree instances to different locations, and a validation is performed at each move to verify that the move results in a reduction in wirelength and conforms with design constraints (e.g., skew and slew). However, the compass-search algorithm-based wirelength reduction is slow because it uses a brute-force approach that tests locations in an unguided way. While it does use the results it has found to guide future searches, storing and maintaining this information utilizes a large amount of computational resources. Additionally, to save runtime, the compass-search algorithm is "greedy," so the algorithm can easily get stuck in a local minimum, which means that despite the high runtime, the algorithm may not find an optimal location.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, traditional techniques for clock tree wirelength reduction rely on brute-force approaches that are computationally intensive and frequently fail to identify optimal solutions. Aspects of the present disclosure address this problem, among others, with systems and methods for clock tree wirelength reduction based on target offsets in connected routes of the clock tree. The systems and methods described herein achieve an improvement to runtime and a reduction in computational resource utilization when compared to traditional brute-force approaches by testing only a single location for each clock tree instance that, based on the manner in which it is identified, is highly likely to result in a reduction to wirelength. In addition, by using the connected routing topology as a guide, the approach described herein is capable of identifying solutions for reducing clock tree wirelength that are difficult for traditional brute-force approaches to identify.

Consistent with some embodiments, a method may include accessing an initial clock tree that interconnects terminals of clock tree instances. The method further includes identifying locations of each terminal of a clock tree instance (e.g., a component in the clock tree) and determining an offset for each terminal. The offset determined for each terminal is based on a distance from the terminal to a branch (e.g., a node connected to two or more edges) in a route connected to the terminal. The method further includes comparing terminal offsets to determine a target offset. A target offset occurs when vertical or horizontal components of terminal offsets are in the same direction. The method further includes moving the clock tree instance from an initial location to a new location determined based on the target offset and updating the routes in the clock tree based on the new location of the clock tree instance. The method may further include performing a validation to verify that the move of the clock tree instance results in a wirelength reduction and to verify that the updated clock tree does not violate timing-based design constraints (e.g., slew and skew).

Figure 1:
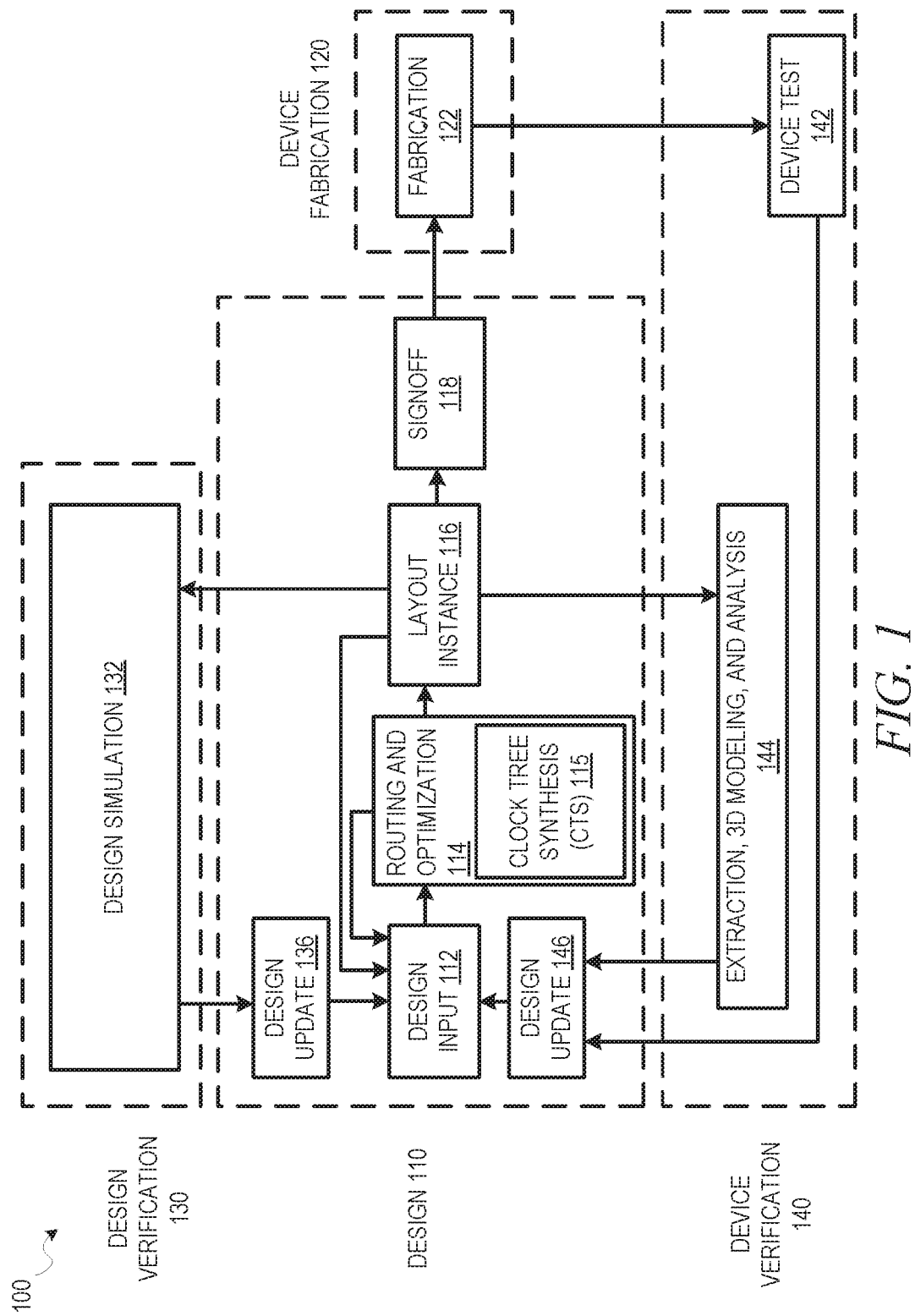
FIG. 1 is a diagram illustrating an example design process flow that includes clock tree wirelength reduction based on target offsets in connected routes, according to some embodiments.
Figure 2:
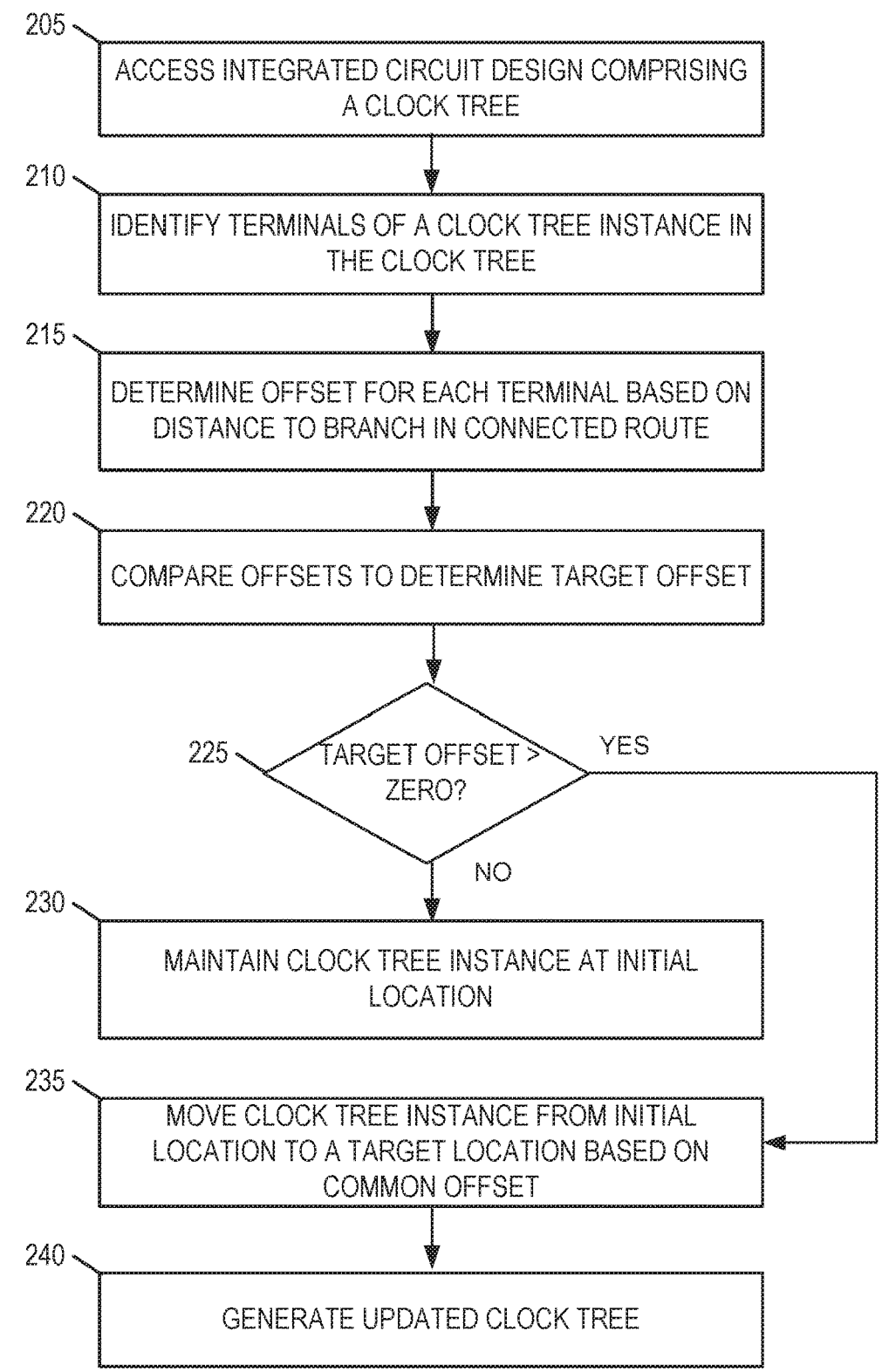
FIGS. 2-5 are flowcharts illustrating operations of a method for clock tree wirelength reduction based on target offsets in connected routes, according to some example embodiments.

FIG. 1 is a diagram illustrating an example design process flow 100 that includes clock tree wirelength reduction based on target offsets in connected routes, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows the routing and optimization 114 operation occurring prior to a layout instance 116, routing, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the routing and optimization 114 operation includes a clock tree synthesis (CTS) 115 operation, which may be performed in accordance with various embodiments described herein. The CTS 115 operation can generate a clock tree that delivers a clock signal from a clock tree root, which comprises a clock source of a circuit design, to a plurality of clock tree leaf nodes, which comprises a plurality of clock tree sinks within the circuit design. According to various embodiments, the clock tree generation performed as part of the CTS 115 operation includes placing clock drivers at various regions of the IC design based on satisfaction of a set of clock tree design constraints, which can include slew, latency, and power consumption by the generated clock tree. Each clock driver delivers the clock signal to a set of clock sinks and/or a set of clock drivers. A clock net of the IC design describes interconnections between a clock driver and the clock sinks and drivers that are driven by the clock driver. Any one of the clock sources, sinks, and drivers may be referred to herein as a "clock tree instance."

As will be discussed in further detail below, an initial clock tree is constructed, for example, using the Steiner-tree approach. With the Steiner-tree approach, a minimum rectilinear Steiner tree (MRST) is used for routing a multi-pin clock net with minimum wirelength. Given in points in the plane, an MRST connects all points by rectilinear lines, possibly via some extra points (called Steiner points), to achieve a minimum-wire-length tree of rectilinear edges. It shall be appreciated that the Steiner-tree approach is merely an example of the approach used to construct the initial clock tree, and in other embodiments, one of several known clock tree construction techniques may be used to construct the initial clock tree.

As will be discussed further below, the initial clock tree may be iteratively refined as part of a clock tree wirelength reduction process. As part of this process, a new potential location for each clock tree instance is determined and validated to verify a wirelength reduction and conformance to timing-based design constraints. At each iteration, terminals of a clock tree instance (e.g., routed pins) are identified and an offset for each terminal is determined based on a distance between the terminal and a branch in the connected route of the terminal. A target offset may be determined based on a minimum common component of the offsets (e.g., vertical and/or horizontal components of the offsets that are in the same direction). If a target offset is identified, the clock tree instance is moved to a target location determined based on the target offset. In particular, the clock tree instance is moved from an initial location to the target location by moving the clock tree instance by the determined target offset. The clock tree is updated based on the new location of the clock tree instance by modifying the connected routes based on the new location (e.g., by shortening one or more routes). Assuming a successful validation of the updated clock tree, a new location of another clock tree instance in the updated clock tree may be determined and validated in the same manner as described above. The process may be repeated for every clock tree instance in the clock tree. Consistent with some embodiments, the clock tree wirelength reduction process may be repeated in multiple passes such that the process is initially performed for each clock tree instance in a first pass, and the process is subsequently performed for each clock tree instance in a second pass.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

FIGS. 2-5 are flowcharts illustrating operations of a method 200 for clock tree wirelength reduction based on target offsets in connected routes, according to some example embodiments. For some embodiments, the method 200 is performed as part of a CTS process applied to a circuit design (e.g., by an EDA software system).

It will be understood that the method 200 may be performed by a device, such as a computing device executing instructions of an EDA software system. For instance, the operations of the method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below with reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

The method 200 as illustrated begins at operation 205 where the computing device accesses an integrated circuit design stored in memory. The integrated circuit design comprises a clock tree comprising one or more routes that interconnect terminals of a plurality of clock tree instances. Consistent with some embodiments, the clock tree may be an initial clock tree generating by building a balanced clock tree that is wirelength inefficient, distributing the clock signal to all sinks along roughly similar length paths. As will be discussed below, the method 200 may be iteratively repeated for each clock tree instance in the clock tree, in which case, the clock tree accessed at operation 205 may, in some instances, be a clock tree that is a modified version of a clock tree that was accessed in a previous iteration of the method 200 at operation 205.

At operation 210, the computing device identifies terminals of a clock tree instance in the clock tree. In the clock tree, each terminal is connected to a route that connects the clock tree instance to another clock tree instance (e.g., a parent or child of the clock tree instance). Some clock tree instances, such as buffers and inverters, may include two terminals (e.g., an input terminal and an output terminal), while other clock tree instances, such as logic gates, may include three or more terminals.

At operation 215, the computing device determines offsets for each terminal of the clock tree instance. The computing device may determine an offset for a terminal based on a distance between a location of the terminal and a branch in the route connected to the terminal. For example, in determining the offset, the computing device may identify a first branch that is encountered in the connected route and measures a rectilinear Manhattan distance between the terminal and the branch. A used herein, a "branch" is a node in a connected route that has two or more edges. Hence, the computing device measures the distance (e.g., the Manhattan distance) from the terminal to the first node encountered in the connected path that has two or more connected edges.

Consistent with some embodiments, the distance between the terminal and the branch is compared to a threshold distance (e.g., 10 µm). If the distance is less than the threshold distance, the offset determined by the computing device comprises the distance between the terminal and the branch in the connected route. If, on the other hand, the distance is greater than the threshold distance, the offset determined by the computing device comprises the threshold distance.

At operation 220, the computing device compares the offsets of the terminals relative to the branches in the connected routes to determine a target offset. The computing device determines the target offset based on a minimum common component of the offsets. As will be discussed in further detail below, in comparing the offsets to determine a target offset, the computing device decomposes each offset into a vertical component (also referred to as a "vertical offset") and a horizontal component (also referred to as a "horizontal offset") To determine a common component, the computing device determines whether either of the vertical or horizontal components of the offsets are in the same direction. If the vertical components are in the same direction, the computing device determines the target offset includes a target vertical offset that corresponds to the vertical offset with the lowest value. If the horizontal components are in the same direction, the computing device determines the target offset includes a target horizontal offset, which corresponds to the horizontal offset with the lowest value. Accordingly, the target offset determined by the computing device may comprise a target vertical offset, a target horizontal offset, or both. If none of the components are in the same direction, the computing device determines the target offset to be zero.

If the computing device determines that the target offset is not greater than zero based on the comparison of the offsets (at operation 225), the computing device maintains the clock tree instance at an initial location in the clock tree, at operation 230.

If, at operation 225, the computing device determines that the target offset is greater than zero based on the comparison of the offsets, then at operation 235 the computing device moves the clock tree instance from the initial location to a target location based on the target offset. The target location and the initial location may be separated by the target offset. In other words, the computing device moves the clock tree instance from the initial location by the target offset, thereby resulting in the clock tree instance being placed at the target location.

At operation 240, the computing device updates the clock tree based on the target location of the clock tree instance thereby resulting in an updated clock tree. In updating the clock tree, the computing device updates one or more connected routes of the clock tree instance to align with the new location of the clock tree instance. The computing device may shorten a length of one or more connected routes of the clock tree instance, thereby achieving a wirelength reduction in the updated clock tree when compared to the clock tree initially accessed at operation 205. Because of design constraints, cells of the IC design are to be aligned into rows, and as a result, in some instances, in updating the clock tree, the computing device may snap the clock tree instance to a nearby location that may not be perfectly aligned with the target location.

Figure 3:
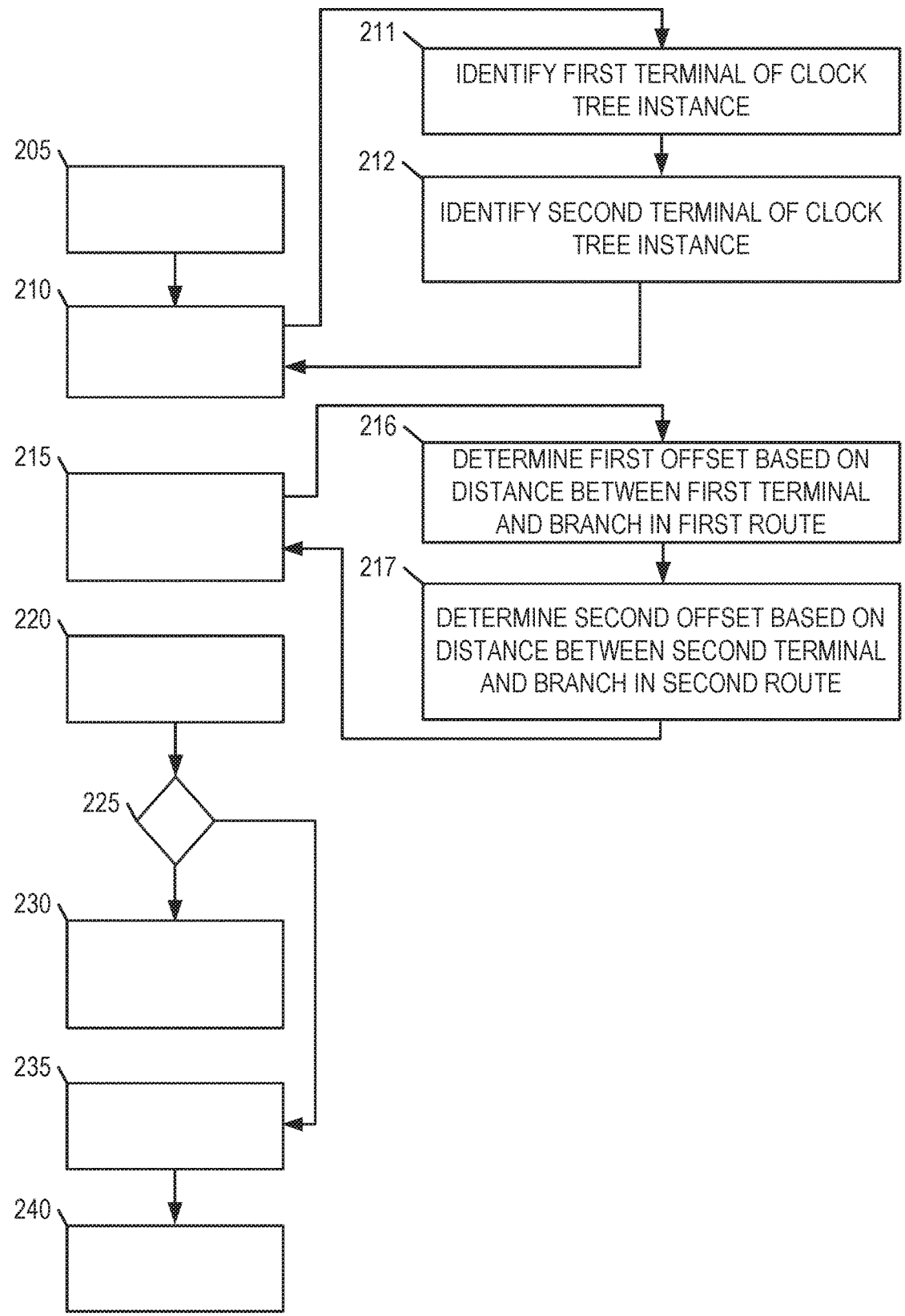

As shown in FIG. 3, the method 200 may, in some embodiments, further include operations 211, 212, 216, 217. Consistent with these embodiments, the operations 211 and 212 may be performed as part (e.g., a sub-routine or sub-operations) of operation 210 where the computing device identifies terminals of the clock tree instance. At operation 211, the computing device identifies a first terminal of the clock tree instance (e.g., an input terminal of a buffer or inverter). The first terminal is connected to a first route in the clock tree that connects the first terminal of the clock tree instance to a terminal of one or more additional clock tree instances.

At operation 212, the computing device identifies a second terminal of the clock tree instance (e.g., an output terminal of a buffer or inverter). The second terminal is connected to a second route in the clock tree that connects the second terminal to a terminal of one or more additional clock tree instances.

Consistent with these embodiments, operations 216 and 217 may be performed as part (e.g., sub-operations or a sub-routine) of the operation 215 where the computing device determines offsets of the terminals of the clock tree. At operation 216, the computing device determines a first offset based on a distance between the first terminal and a branch in the first route. For example, the computing device may identify a first branch that is encountered in the connected route of the first terminal and measure a Manhattan distance between the first terminal and the branch.

At operation 217, the computing device determines a second offset based on a distance between the second terminal and a branch in the second route. For example, the computing device may identify a first branch that is encountered in the connected route of the second terminal and measure a Manhattan distance between the second terminal and the branch.

Figure 4:
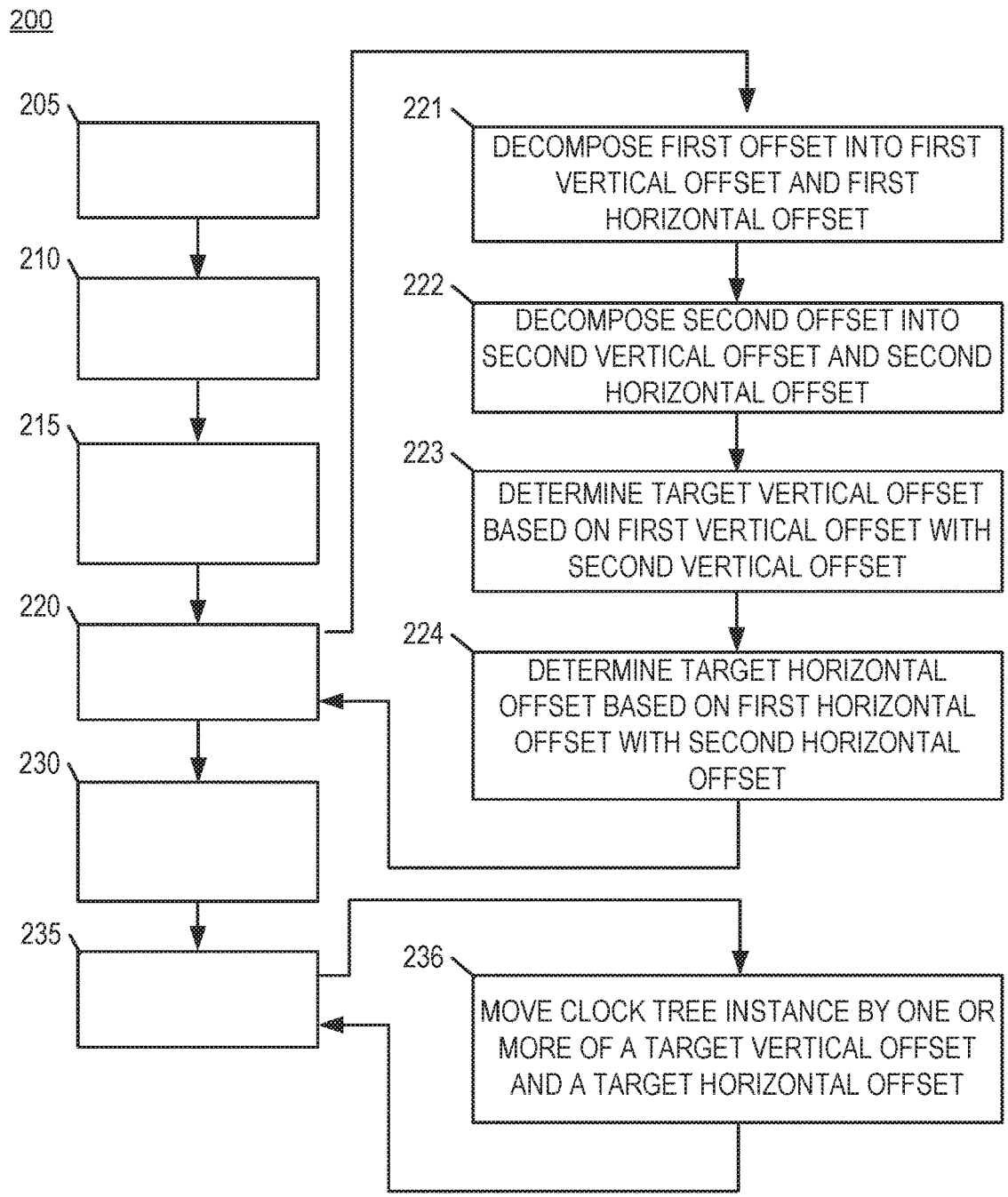

As shown in FIG. 4, the method 200 may, in some embodiments, include operations 221-224 and 236. Consistent with some embodiments, operations 221-224 may be performed as part (e.g., sub-operations or a sub-routine) of operation 220 where the computing device compares the offsets of the terminals of the clock tree instance. At operation 221, the computing device decomposes the first offset into a first vertical offset and a first horizontal offset. The first vertical offset is the vertical component of the first offset, and the first horizontal offset is the horizontal component of the first offset.

In decomposing the first offset, the computing device may compare the vertical or horizontal component of the first offset with a threshold distance. If the vertical and horizontal components are less than the threshold distance, the computing device sets the first vertical and horizontal offsets in accordance with the vertical and horizontal components of the first offset. However, if the vertical component of the first offset exceeds the threshold distance, the computing device sets the first vertical offset as the threshold distance. Similarly, if the horizontal component of the first offset exceeds the threshold distance, the computing device sets the first horizontal offset as the threshold distance.

At operation 222, the computing device decomposes the second offset into a second vertical offset and a second horizontal offset. The second vertical offset is the vertical component of the second offset, and the second horizontal offset is the horizontal component of the second offset. In decomposing the second offset, the computing device may also compare the vertical or horizontal component of the second offset with the threshold distance. If the vertical and horizontal components are less than the threshold distance, the computing device sets the second vertical and horizontal offsets in accordance with the vertical and horizontal components of the second offset. However, if the vertical component of the second offset exceeds the threshold distance, the computing device sets the second vertical offset as the threshold distance. Similarly, if the horizontal component of the second offset exceeds the threshold distance, the computing device sets the second horizontal offset as the threshold distance.

The computing device, at operation 223, compares the first vertical offset with the second vertical offset to determine a target vertical offset. In comparing the first vertical offset with the second vertical offset, the computing device determines whether the first and second vertical offsets are in the same direction (e.g., upward or downward). If the first and second vertical offsets are in the same direction, the computing device selects the minimum vertical offset (e.g., the vertical offset corresponding to the shortest distance) as the target vertical offset. Hence, the target vertical offset comprises a vertical distance corresponding to the minimum vertical offset. If the first and second vertical offsets are not in the same direction (e.g., the first vertical offset is upward, and the second vertical offset is downward), the computing device determines the target vertical offset is zero.

The computing device, at operation 224, compares the first horizontal offset with the second horizontal offset to determine a target horizontal offset. In comparing the first horizontal offset with the second horizontal offset the computing device determines whether the first and second horizontal offsets are in the same direction (e.g., rightward or leftward). If the first and second horizontal offsets are in the same direction, the computing device selects the minimum horizontal offset (e.g., the horizontal offset corresponding to the shortest distance) as the target horizontal offset. Hence, the target horizontal offset may comprise a horizontal distance corresponding to the minimum horizontal offset. If the first and second horizontal offsets are not in the same direction (e.g., the first horizontal offset is rightward, and the second horizontal offset is leftward), the computing device determines the target horizontal offset is zero.

Consistent with these embodiments, operation 236 may be performed as part (e.g., a sub-operation) of the operation 235 where the computing device moves the clock tree instance from an initial location to a target location.

At operation 236, the computing device moves the clock tree instance by one or more of a target vertical offset (e.g., determined by the comparison performed at operation 223) and a target horizontal offset (e.g., determined by the comparison performed at operation 224). That is, in moving the clock tree instance at operation 235, the computing device may move the clock tree instance in the vertical direction by the target vertical offset, move the clock tree instance in the horizontal direction by the target horizontal offset, or both.

Although FIGS. 3 and 4 address an example in which a clock tree instance has two terminals, as noted above, a clock tree instance may have two or more clock tree instances. Thus, it shall be appreciated that the methodology described above in reference to FIGS. 3 and 4 is not intended to be limited in application to clock tree instances with only two terminals and this methodology may also be applicable to clock tree instances with more than two terminals.

Figure 5:
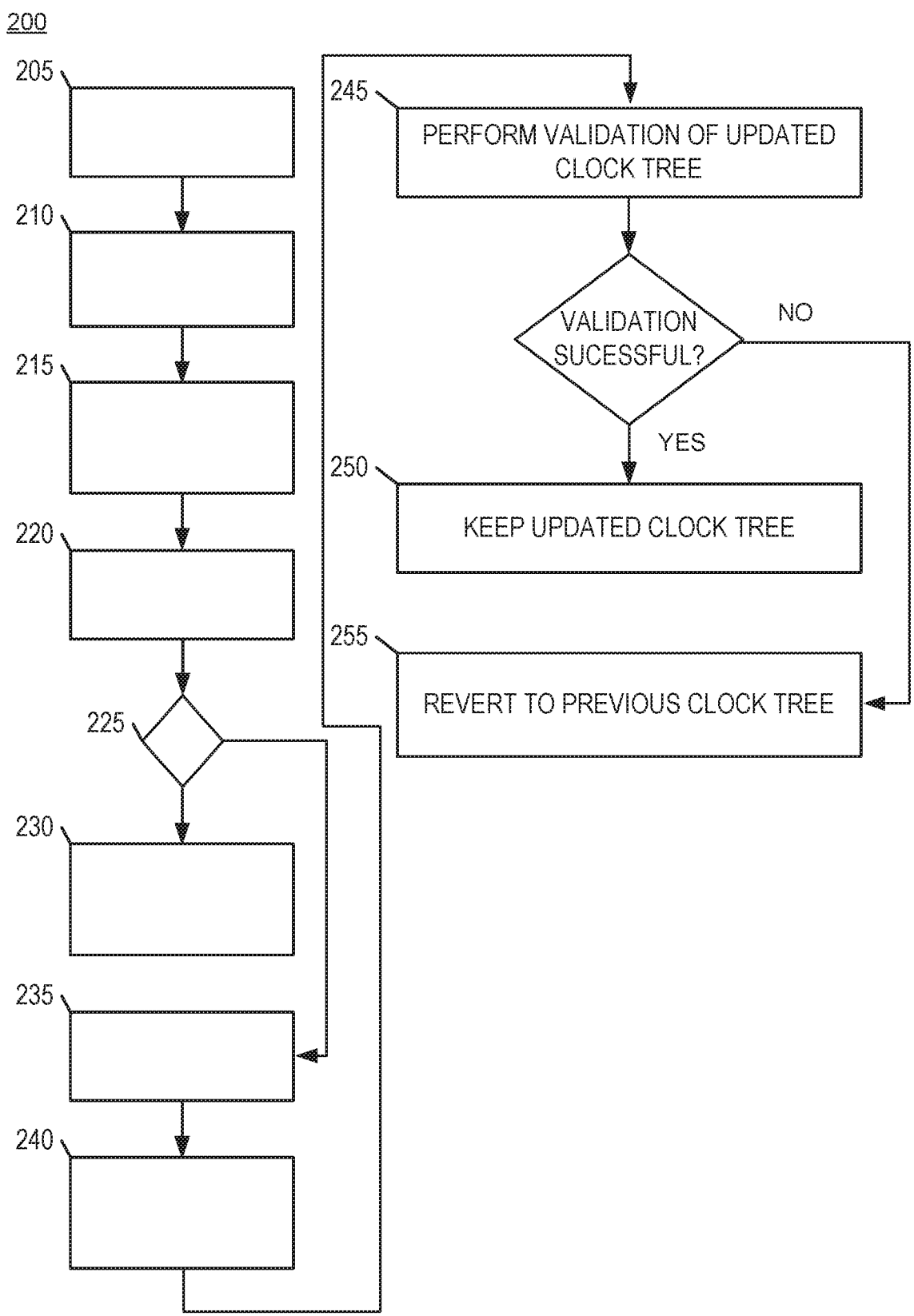

As shown in FIG. 5, the method 200 may, in some embodiments, include operations 245, 250, and 255. Consistent with these embodiments, the operations 245, 250, and 255 may be performed subsequent to operation 240 where the computing device updates the clock tree, which results in an updated clock tree. At operation 245, the computing device performs a validation of the updated clock tree. In performing the validation, the computing device validates that moving the clock tree instance by the target offset results in a wirelength reduction when compared to the clock tree initially accessed at operation 205. The computing device also validates that the updated clock tree does not violate any timing constraints (e.g., skew and slew).

If the validation is successful, the computing device keeps the updated clock tree (operation 250). If the validation is not successful, the computing device discards the updated clock tree and reverts to the previous clock tree (operation 255). In reverting to the previous clock tree, the computing device may move the clock tree instance back to the initial location.

Figure 6A:
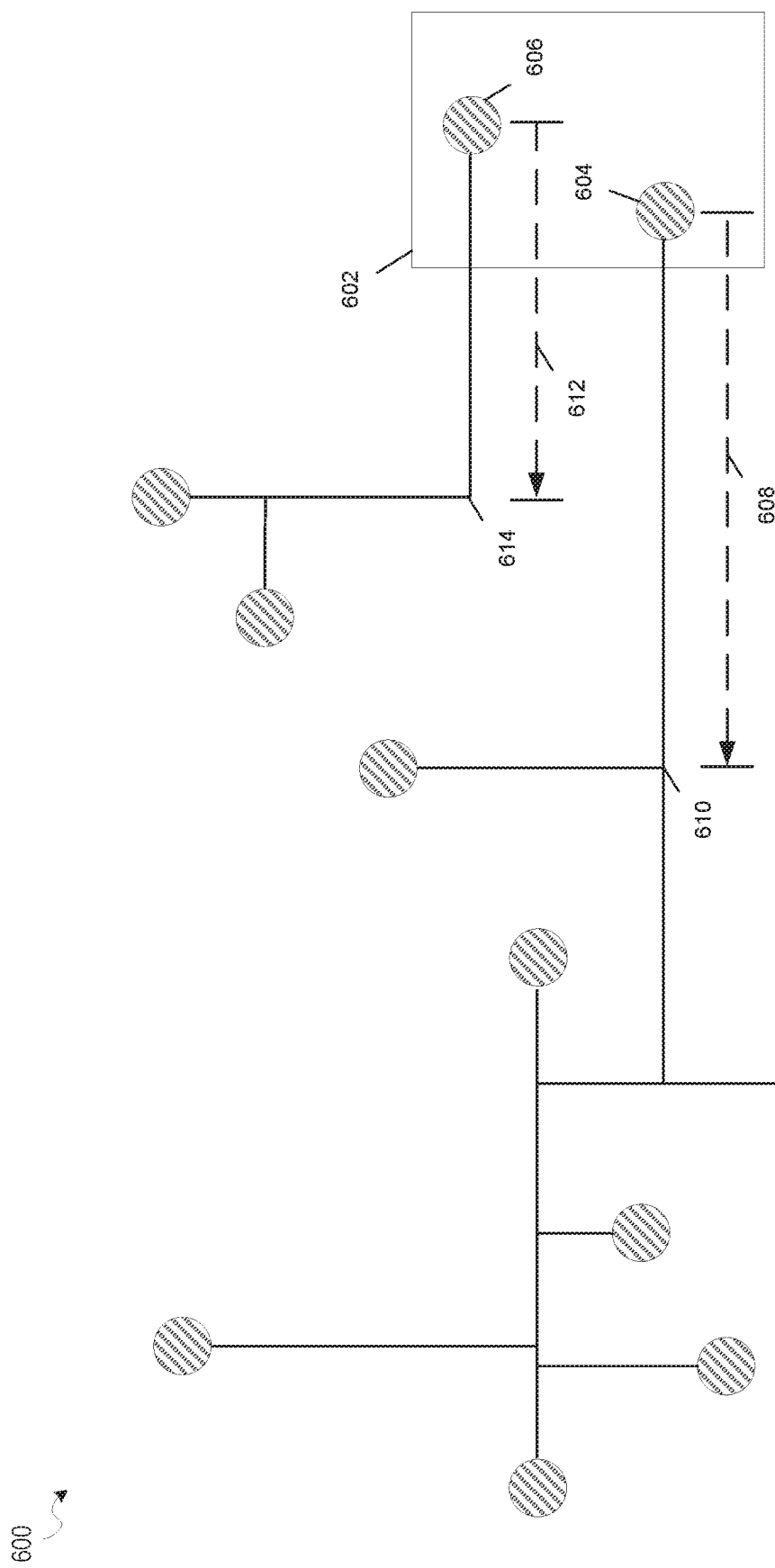
FIGS. 6A and 6B are conceptual diagrams that graphically illustrate a method for clock tree wirelength reduction based on target offsets in connected routes, according to some embodiments.
Figure 6B:
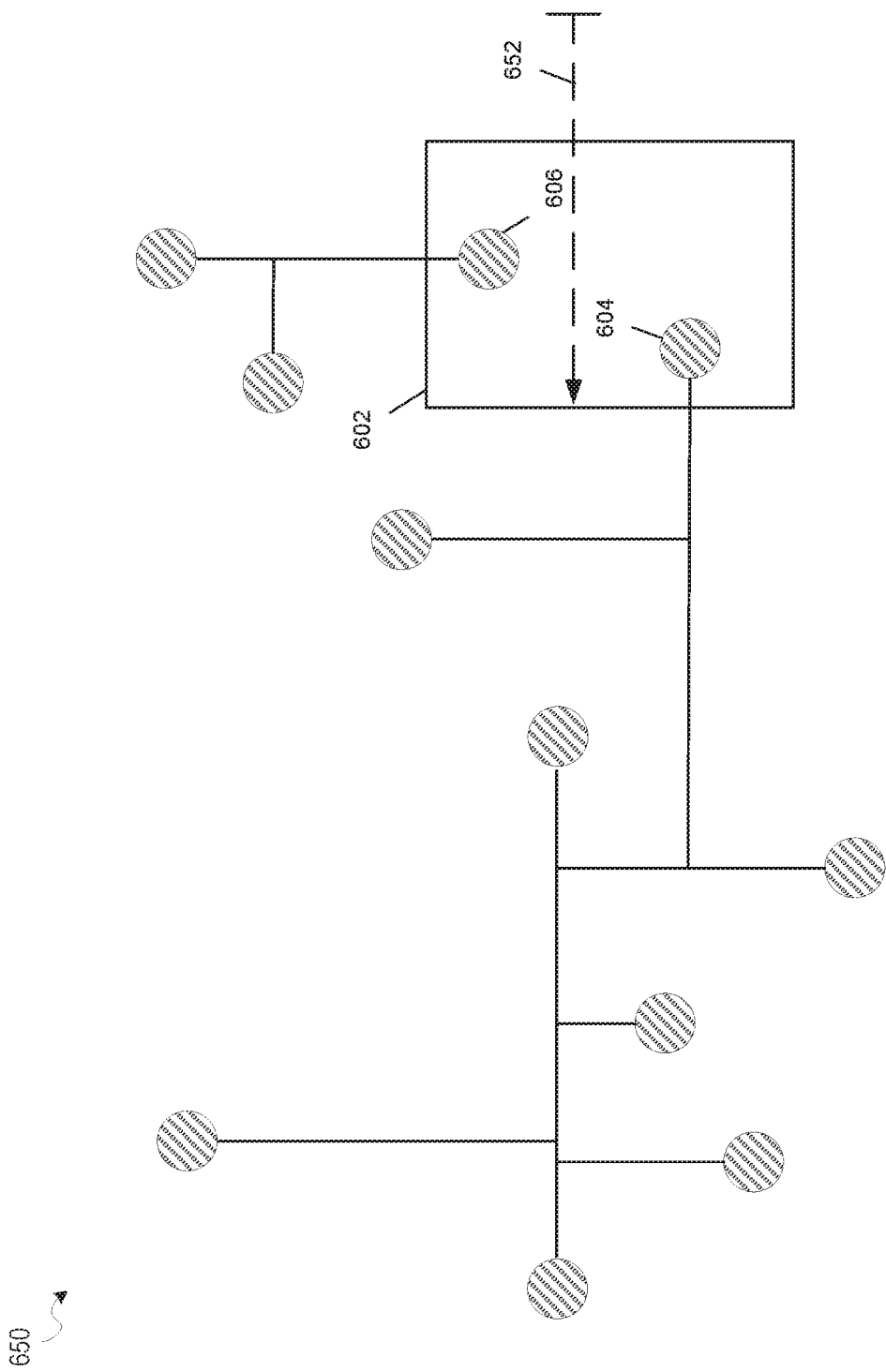

Regardless of whether the updated clock tree is kept (at operation 250) or discarded (at operation 255) or whether the clock tree instance is maintained at its initial location (at operation 230), the computing device may return to operation 205 and repeat the method 200 for another clock tree instance in the clock tree. That is, the computing device may attempt to move another clock tree instance based on target offsets in its connected routes. What's more, the method 200 may be iteratively repeated such that the operations of the method 200 are performed with respect to each clock tree instance in the clock tree. On subsequent iterations of the method 200, the clock tree accessed by the computing device at operation 205 may be an updated clock tree produced as a result of performing the previous iteration of the method 200, assuming that the updated clock tree was successfully validated. Otherwise, the clock tree accessed at a subsequent iteration of the method 200 is the same clock tree accessed at the previous iteration of the method 200. The above referenced process may be repeated for each clock tree FIGS. 6A and 6B are conceptual diagrams that graphically illustrate a method for clock tree wirelength reduction based on target offsets in connected routes, according to some embodiments. Consistent with some embodiments, FIGS. 6A and 6B graphically illustrated the method 200. With reference to FIG. 6A, an initial clock tree 600 is illustrated. The initial clock tree 600 comprises routes that interconnect terminals of clock tree instances. As shown, a clock tree instance 602 comprises terminals 604 and 606. An offset 608 separates the terminal 604 from a branch 610 in a route connected to the terminal 604, and an offset 612 separates the terminal 606 from a branch 614 in a route connected to the terminal 606. As shown, the offsets 608 and 612 are both in the same horizontal direction.

With reference to FIG. 6B, an updated clock tree 650 is illustrated. The updated clock tree 650 comprises an update to the initial clock tree 600. In particular, in the updated clock tree 650, the clock tree instance 602 has been moved from its location illustrated in FIG. 6A to a new location based on a target offset 652 determined based on a comparison of the offsets 608 and 612. More specifically, the clock tree instance 602 has been moved by the distance of the target offset 652. As shown, the target offset 652 corresponds to the offset 612, since the offset 608 is the smaller of the two offsets. The result of moving the clock tree instance 602 by the target offset 652 is a wirelength reduction in the updated clock tree 650 when compared to the initial clock tree 600.

Figure 7A:
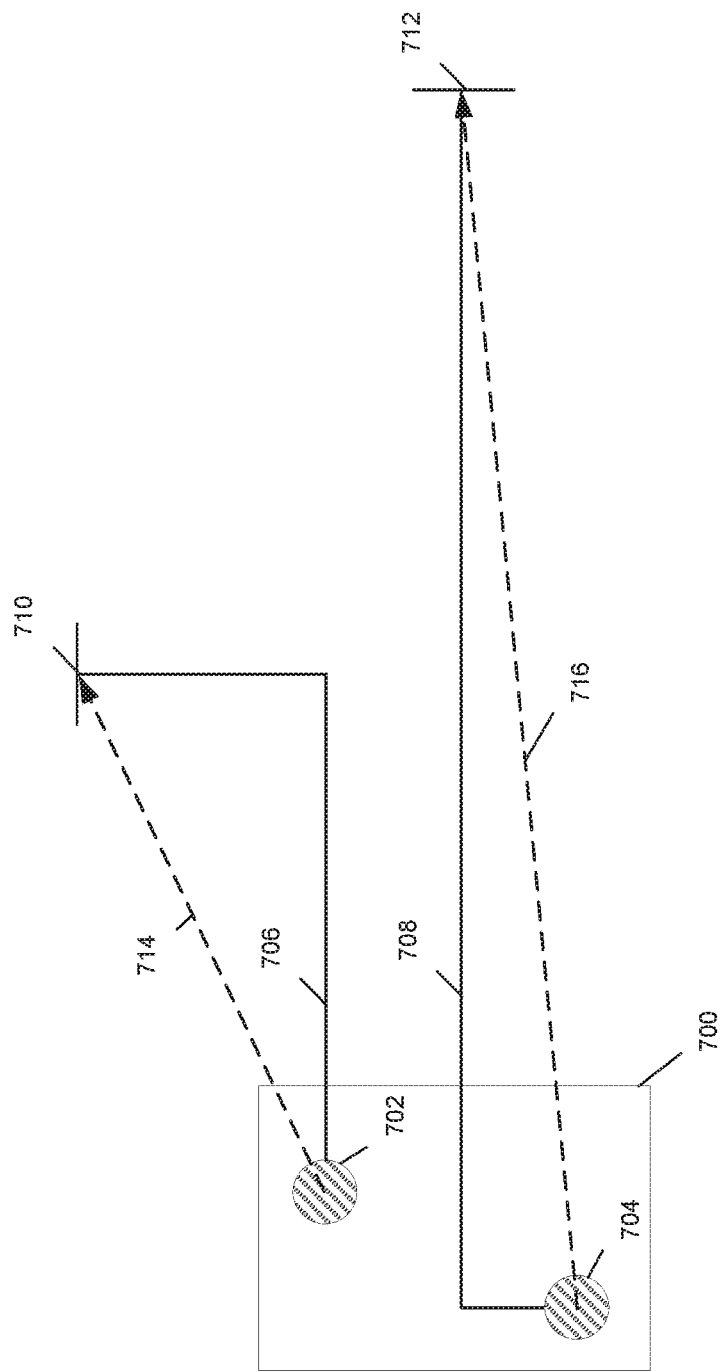
FIGS. 7A and 7B are conceptual diagrams that graphically illustrate an operation of determining a target offset in connected routes of a clock tree instance, which is performed as part of a method for clock tree wirelength reduction, according to some example embodiments.
Figure 7B:
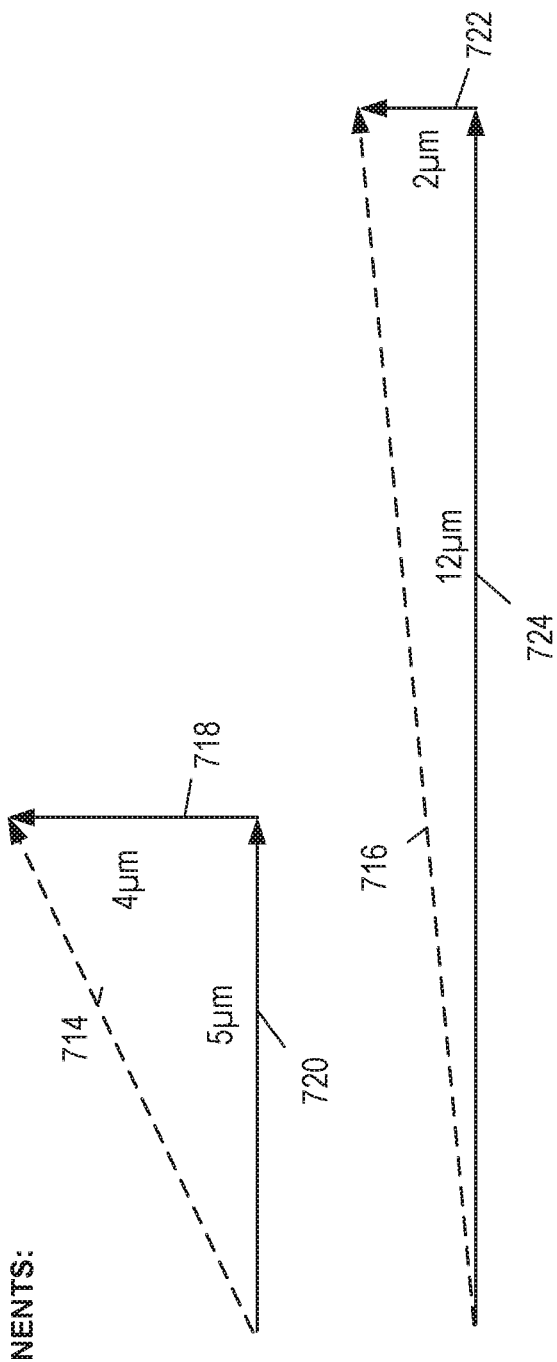
Figure 7B:
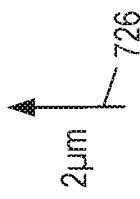
Figure 7B:

FIGS. 7A and 7B are conceptual diagrams that graphically illustrate an operation of determining a target offset in connected routes of a clock tree instance 700 (e.g., performed by a computing device executing instructions of an EDA software system), according to some example embodiments. Consistent with some embodiments, the operation of determining the target offset in connected routes of the clock tree instance 700 corresponds to the operation 220 of the method 200. It will be understood that the operations illustrated in FIGS. 7A and 7B are performed by a device, such as a computing device executing instructions of an EDA software system, and accordingly FIGS. 7A and 7B may be described below with reference to such a computing device.

As shown in FIG. 7A, the clock tree instance 700 includes terminals 702 and 704. A route 706 is connected to the terminal 702, and a route 708 is connected to the terminal 704. The route 706 includes a branch 710 (e.g., a node with two or more connected edges), and the route 708 includes a branch 712. As shown, an offset 714 corresponds to a distance between the terminal 702 and the branch 710, and an offset 716 corresponds to a distance between the terminal 704 and the branch 712.

FIG. 7B illustrates a comparison of the offsets 714 and 716 performed to determine a target offset in the routes 706 and 708 for the clock tree instance 700. As shown in FIG. 713B, the offsets 714 and 716 are decomposed into a vertical component and a horizontal component. Specifically, the offset 714 is decomposed into a vertical offset 718 (4 µm) and a horizontal offset 720 (5 µm), and the offset 716 is decomposed into a vertical offset 722 (2 µm) and a horizontal offset 724 (12 µm). In determining a target offset, the vertical offset 718 of the offset 714 is compared (e.g., by the computing device) with the vertical offset 722 of the offset 716, and the horizontal offset 720 of the offset 714 is compared (e.g., by the computing device) with the horizontal offset 724 of the offset 716.

A target vertical offset 726 is identified (e.g., by the computing device) based on the vertical offsets 718 and 722 being in the same direction (i.e., upward), and a target horizontal offset 728 is identified (e.g., by the computing device) based on the horizontal offsets 720 and 724 being in the same direction (i.e., rightward). The vertical offset 722 of the offset 716 is selected as the target vertical offset 726 (2 µm) based on the vertical offset 722 corresponding to the minimum value (2 µm<4 µm) of the vertical offsets 718 and 722. The horizontal offset 720 is selected as the target horizontal offset 728 (5 µm) based on the horizontal offset 720 corresponding to the minimum value (5 µm<12 µm) of the horizontal offsets 720 and 724.

Figure 8:
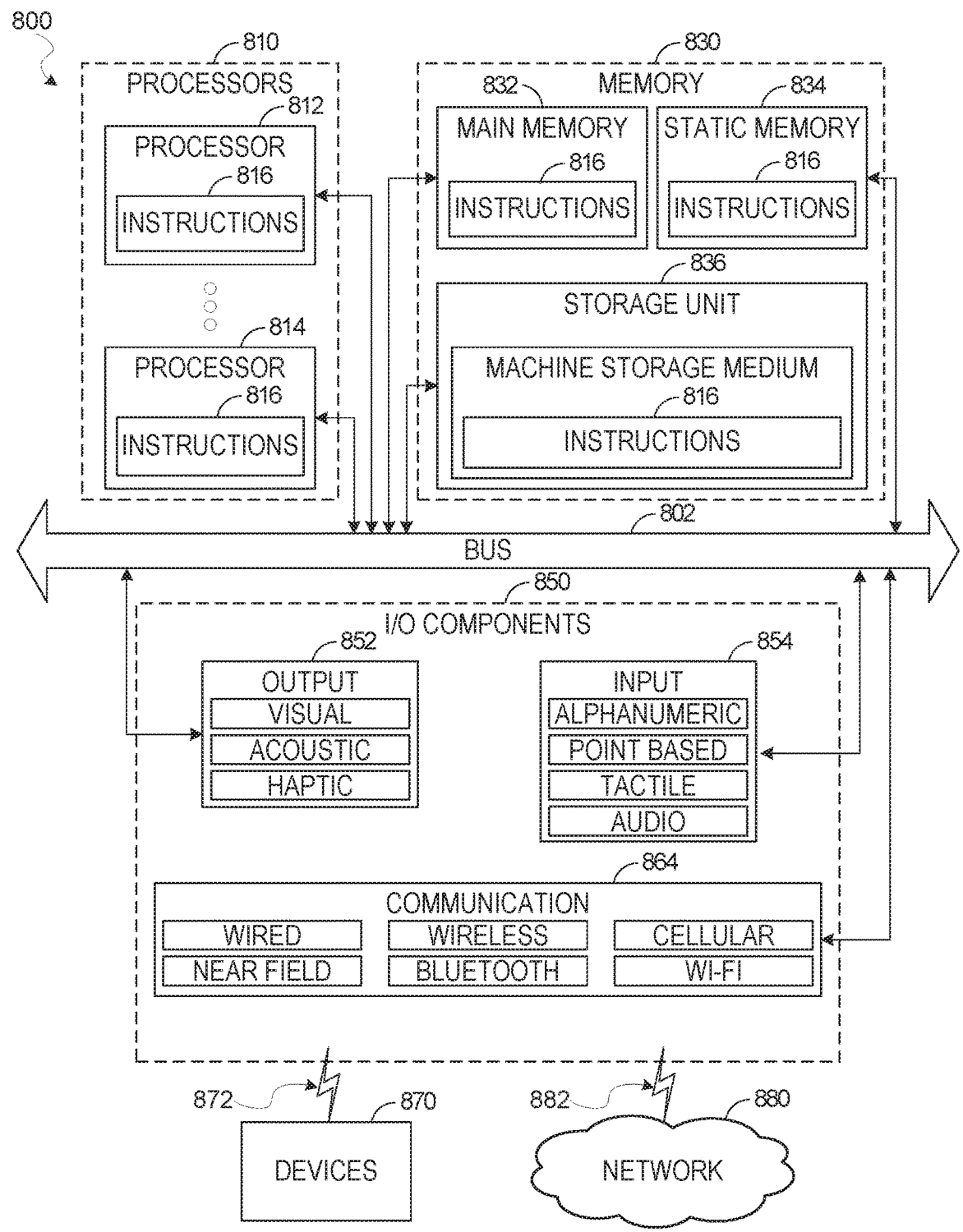
FIG. 8 is a diagrammatic representation of a machine in the example form of a computer system within which a set of instructions for causing the machine to perform any one or more of the methodologies discussed herein may be stored and executed.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute an EDA software system that executes the method 200. Additionally, or alternatively, the instructions 816 may implement FIGS. 1, 6A, 6B, 7A, and 7B. The instructions 816 transform the general, non-programmed machine 800) into a particular machine 800 programmed to carry out the described and illustrated functions in the manner described here. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, each accessible to the processors 810 such as via the bus 802, The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components (NFC, Bluetooth, and Wifi) to provide communication via other modalities. The devices 870 may be another machine or any of a wide variety of peripheral devices (e.g., a peripheral device coupled via a universal serial bus (USB)).

Executable Instructions and Machine-Storage Medium

The various memories (e.g., 830, 832, 834, and/or memory of the processor(s) 810) and/or the storage unit 836 may store one or more sets of instructions and data structures (e.g., software) embodying or utilized by any one or more of the methodologies or functions described herein. These instructions, when executed by the processor(s) 810, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   a computer storage medium storing instructions, which when executed by the machine, cause the machine to perform operations comprising:
      accessing an integrated circuit design stored in memory, the integrated circuit design comprising a clock tree comprising routes that interconnect terminals of a plurality of clock tree instances;
      identifying a first terminal of a clock tree instance of the plurality of clock tree instances, the first terminal being connected to a first route;
      identifying a second terminal of the clock tree instance, the second terminal being connected to a second route;
      determining a first offset by measuring a distance between the first terminal and a branch in the first route, the branch in the first route comprising a node in the first route that is connected to two or more edges;
      determining a second offset by measuring a distance between the second terminal and a branch in the second route, the branch in the second route comprising a node in the second route that is connected to two or more edges;
      determining a target offset based on a comparison of the first offset to the second offset;
      moving the clock tree instance from a first location to a second location based on the target offset, the first and second locations being separated by the target offset; and
      generating an updated clock tree for the integrated circuit design based on moving the clock tree instance from the first location to the second location.

2. The system of claim 1, wherein the determining of the target offset comprises:
   decomposing the first offset into a first vertical offset and a first horizontal offset;
   decomposing the second offset into a second vertical offset and a second horizontal offset;

determining a target vertical offset by comparing the first vertical offset with the second vertical offset; and determining a target horizontal offset by comparing the first horizontal offset with the second horizontal offset.

3. The system of claim 2, wherein the target offset comprises at least one of the target vertical offset and the target horizontal offset.

4. The system of claim 2, wherein moving the clock tree instance from the first location to the second location comprises at least one of:

moving the clock tree instance in a vertical direction by the target vertical offset; and moving the clock tree instance in a horizontal direction by the target horizontal offset.

5. The system of claim 1, wherein:

the determining of the first offset comprises determining a Manhattan distance between the first terminal and the branch in the first route;

the determining of the second offset comprises determining a Manhattan distance between the second terminal and the branch in the second route.

6. The system of claim 1, wherein the operations further comprise:

updating one or more routes of the clock tree in response to moving of the clock tree instance from the first location to the second location, the updating of the one or more routes resulting in an updated clock tree; and performing a validation of the updated clock tree to verify that the moving of the clock tree instance results in a wirelength reduction.

7. The system of claim 6, wherein the operations further comprise:

moving the clock tree instance back to the first location in response to the updated clock tree failing the validation.

8. The system of claim 1, wherein the operations further comprise generating a layout instance for the integrated circuit design based in part on the updated clock tree, the layout instance describing physical layout dimensions of the integrated circuit design.

9. A method comprising:

accessing an integrated circuit design stored in memory, the integrated circuit design comprising a clock tree comprising routes that interconnect terminals of a plurality of clock tree instances, a clock tree instance of the plurality of clock tree instances comprising a first and a second terminal, the first terminal being connected to a first route, the second terminal being connected to a second route;

determining, by at least one hardware processor, a first offset by measuring a distance between the first terminal of the clock tree instance and a branch in the first route connected to the first terminal, the branch in the first route comprising a node in the first route that is connected to two or more edges;

determining, by at least one hardware processor, a second offset by measuring a distance between the second terminal of the clock tree instance and a branch in the second route connected to the second terminal, the branch in the second route comprising a node in the second route that is connected to two or more edges;

comparing, by at least one hardware processor, the first offset to the second offset to determine a target offset; and moving, by at least one hardware processor, the clock tree instance from a first location to a second location based on the target offset, the moving of the clock tree instance from the first location to the second location comprising moving the clock tree instance by the target offset.

10. The method of claim 9, wherein the comparing of the first and second offsets comprises:

decomposing the first offset into a first vertical offset and a first horizontal offset;

decomposing the second offset into a second vertical offset and a second horizontal offset;

determining a target vertical offset by comparing the first vertical offset with the second vertical offset, the target vertical offset corresponding to a lesser of the first vertical offset and the second vertical offset; and determining a target horizontal offset by comparing the first horizontal offset with the second horizontal offset, the target horizontal offset corresponding to a lesser of the first horizontal offset and the second horizontal offset.

11. The method of claim 10, wherein the target offset comprises at least one of the target vertical offset and the target horizontal offset.

12. The method of claim 10, wherein the moving of the clock tree instance comprises at least one of:

moving the clock tree instance in a vertical direction by the target vertical offset; and moving the clock tree instance in a horizontal direction by the target horizontal offset.

13. The method of claim 9, wherein the determining of the first offset comprises:

determining whether the distance between the first terminal and the branch in the first route exceeds a threshold distance; and based on determining that the distance exceeds the threshold distance, determining that the first offset is the threshold distance.

14. The method of claim 9, further comprising performing a validation to verify that moving the clock tree instance results in a wirelength reduction.

15. The method of claim 14, further comprising:

moving the clock tree instance back to the first location in response to determining that moving the clock tree instance does not result in a wirelength reduction.

16. The method of claim 9, generating a layout instance for the integrated circuit design based in part on the updated clock tree, the layout instance describing physical layout dimensions of the integrated circuit design.

17. A computer storage medium storing instructions, which when executed by a machine, cause the machine to perform operations comprising:

accessing an integrated circuit design stored in memory, the integrated circuit design comprising a clock tree comprising routes that interconnect terminals of a plurality of clock tree instances;

identifying a first terminal corresponding to a first terminal of a clock tree instance of the plurality of clock tree instances, the first terminal being connected to a first route;

identifying a second terminal corresponding to a second terminal of the clock tree instance, the second terminal being connected to a second route;

determining a first offset by measuring a distance between the first terminal and a branch in the first route, the branch in the first route comprising a node in the first route that is connected to two or more edge;

determining a second offset by measuring a distance between the second terminal and a branch in the second route, the branch in the second route comprising a node in the second route that is connected to two or more edges;

comparing the first offset to the second offset to determine a target offset;

moving the clock tree instance from a first location to a second location based on the target offset, the first and second locations being separated by the target offset; and updating the clock tree in response to the moving of the clock tree instance from the first location to the second location.

18. The computer storage medium of claim 17, wherein the comparing of the first and second offsets comprises:

decomposing the first offset into a first vertical offset and a first horizontal offset;

decomposing the second offset into a second vertical offset and a second horizontal offset;

determining a target vertical offset by comparing the first vertical offset with the second vertical offset; and determining a target horizontal offset by comparing the first horizontal offset with the second horizontal offset.

19. The computer storage medium of claim 18, wherein the target offset comprises at least one of the target vertical offset and the target horizontal offset.

20. The computer storage medium of claim 19, wherein the moving of the clock tree instance from the first location to the second location comprises:

moving the clock tree instance in a vertical direction by the target vertical offset; and moving the clock tree instance in a horizontal direction by the target horizontal offset.

* * * * *